(12) United States Patent
Ragnunath et al.

(10) Patent No.: US 7,668,974 B2
(45) Date of Patent: Feb. 23, 2010

(54) METHOD AND SYSTEM FOR LOCAL PROVISIONING OF DEVICE DRIVERS FOR PORTABLE STORAGE DEVICES

(75) Inventors: Mandayam Thondanur Ragnunath, Fishkill, NY (US); Chandrasekhar Narayanaswami, Wilton, CT (US)

(73) Assignee: International Business Machines Corporation, Armonk, NY (US)

( * ) Notice: Subject to any disclaimer, the term of this patent is extended or adjusted under 35 U.S.C. 154(b) by 306 days.

(21) Appl. No.: 11/263,882

(22) Filed: Nov. 1, 2005

(65) Prior Publication Data

US 2007/0101118 A1 May 3, 2007

(51) Int. Cl.
*G06F 3/00* (2006.01)
*G06F 9/445* (2006.01)
*G06F 15/177* (2006.01)
(52) U.S. Cl. .................. 710/8; 710/15; 717/178; 709/221
(58) Field of Classification Search .......... 710/8, 710/15; 717/178; 709/221
See application file for complete search history.

(56) References Cited

U.S. PATENT DOCUMENTS

| | | | | |
|---|---|---|---|---|
| 5,812,857 A | * | 9/1998 | Nelson et al. | 717/173 |
| 5,870,610 A | * | 2/1999 | Beyda | 717/173 |
| 5,923,885 A | * | 7/1999 | Johnson et al. | 717/176 |
| 5,974,454 A | * | 10/1999 | Apfel et al. | 709/221 |
| 6,009,480 A | * | 12/1999 | Pleso | 710/8 |
| 6,282,709 B1 | * | 8/2001 | Reha et al. | 717/175 |
| 6,345,288 B1 | * | 2/2002 | Reed et al. | 709/201 |
| 6,557,054 B2 | * | 4/2003 | Reisman | 710/33 |
| 6,645,077 B2 | * | 11/2003 | Rowe | 463/42 |
| 6,916,128 B1 | * | 7/2005 | Petteruti et al. | 400/88 |
| 7,308,570 B2 | * | 12/2007 | Young et al. | 713/2 |
| 2003/0135668 A1 | * | 7/2003 | Abe | 710/15 |

* cited by examiner

*Primary Examiner*—Alford W Kindred
*Assistant Examiner*—Farley J Abad
(74) *Attorney, Agent, or Firm*—Michael J. Buchenhorner; Kenneth R. Corsello

(57) ABSTRACT

A computer-implemented method includes steps of: coupling a portable device comprising a personal computing environment to a host computer system; booting the host computer system from the portable device; determining that the portable device does not have a driver for one or more hardware elements found in the host computer system; transmitting a request to a local zone provisioning server, for the one or more device drivers.

15 Claims, 4 Drawing Sheets

METHOD AND SYSTEM FOR LOCAL PROVISIONING OF DEVICE DRIVERS FOR PORTABLE STORAGE DEVICES

CROSS-REFERENCE TO RELATED APPLICATIONS

This application relates to technology similar to that of U.S. patent application Ser. No. 10/795,153, which is hereby incorporated by reference.

FIELD OF THE INVENTION

The invention disclosed broadly relates to the field of information processing systems, and more particularly relates to the field of portable electronic devices storing a personal computing environment.

BACKGROUND OF THE INVENTION

Advanced information storage technologies have made it possible and affordable for computer users to carry large amounts of digital information in physically small storage devices. Such portable devices can store amounts of information in excess of forty gigabytes in portable devices small enough to fit in a user's shirt pocket.

Today's laptop computers give users two highly desirable features. One is the ability to suspend a computing session (e.g., running applications, open windows) and resume it later, perhaps at a different location. The other is access to their personal and familiar software environment (e.g., applications, files, preferences) wherever they are. In spite of this convenience, a major drawback of this model is that the user has to carry a laptop, which is a fairly bulky device. In addition, though docking stations allow the user to use a larger display and attach some peripherals, the user is limited to the capabilities of the hardware integrated in the portable computer, such as the processor and memory.

Before the advent of portable computers, there were two main approaches to suspending a session in one location and resuming it at another. One method was based on process migration between the machines at the two locations. Another technique was to move just the user interface and graphical windows across stationary machines while continuing to run the application processes on a single machine. There are several solutions that store the user's data on a central server to make it possible for a user to log in to one of several machines that are connected to the server and have a common startup environment.

More recent solutions to this problem have centered on the use of virtual machines. For example, in Internet Suspend/Resume (ISR) the user's computation state is stored as a check-pointed virtual machine image in the network when computation is suspended, and retrieved from the network when computation is resumed at a machine that has similar base software. ISR has since explored using a portable device as a cache.

Another trend is the availability of ubiquitous computing devices available to users. Many users would benefit from this ubiquitous computing environment if they could carry their personal computing environment with them. The portable device (PD) discussed in U.S. patent application, Ser. No. 10/795,153 (herein incorporated by reference), allows any user to use any remote computer as if it were his or her own computer and when the user finishes working on that host computer the portable device saves the state of the computing environment. However, one current limitation of that device is that the user's portable device may not have some of the specific device drivers for devices in the host computer and may have to revert instead to generic drivers that may limit the function or performance of the host peripherals. Users of such PD's may find desirable the use of public personal computers such as those in cybercafes as hosts for the PD. However, those users may not trust the computers available at cybercafés because they may be infected with Trojan Horses or viruses that can hijack a user's email password and otherwise provide a non-secure, non-trusted environment. The PD helps address this situation by booting the cybercafé PC using software that the user trusts and controls, but as mentioned above, the PD may not be appropriately configured with the relevant device drivers for the cybercafé PC. Moreover, before a user can use a cybercafé computer to access the Internet, the cybercafé administrator may charge the user and require a payment method. These difficulties also impact the ability to download desired device drivers because of security concerns.

Prior art includes the provisioning of updates to the software stored on computers, including device drivers from remote servers. However, the computer whose software is updated usually has adequate software to be operable so that the computer can connect to the remote provisioning server and also provide enough of a user interaction capability so that the user can interactively control the software update process. Prior art thus waits for the booting sequence to complete, before fetching drivers from remote servers. In our situation we may come across a host system for which we do not have drivers for the installed hardware and may be unable to boot it up to a stage where we can connect to a remote provisioning server and download the drivers. In such cases the local zone provisioning server could be in the local network. To connect to a remote provisioning server we may need to authenticate with the firewall 110 and perhaps provide a payment that will require the host system to be fully booted to a point where the user can enter a payment credential such as a credit card on the host system or some other form of payment accepted in the local zone that will authenticate the host processing system with the firewall. The described method allows the PD to transparently download the drivers from the local zone provisioning server so that the PD is usable even with host systems for which it does not have any device drivers except for the network driver.

Therefore, there is a need for a method and system that provides a user with a means to carry his or her personal computing environment and work in progress (i.e., open windows and partially edited documents) and use that environment in several computers at different locations that overcomes the above shortcoming.

SUMMARY OF THE INVENTION

Briefly, according to an embodiment of the invention, the above shortcomings are solved by the use of a local zone provisioning server in a local service zone for use by portable devices using a local host computer. The local zone provisioning server stores drivers that are relevant to PC hardware that is installed in the service zone. The device drivers may be signed by an authority trusted by the portable device. In some embodiments, the local zone provisioning server may be in the service zone and in other embodiments it may be on the Internet.

DETAILED DESCRIPTION

Figure 1:
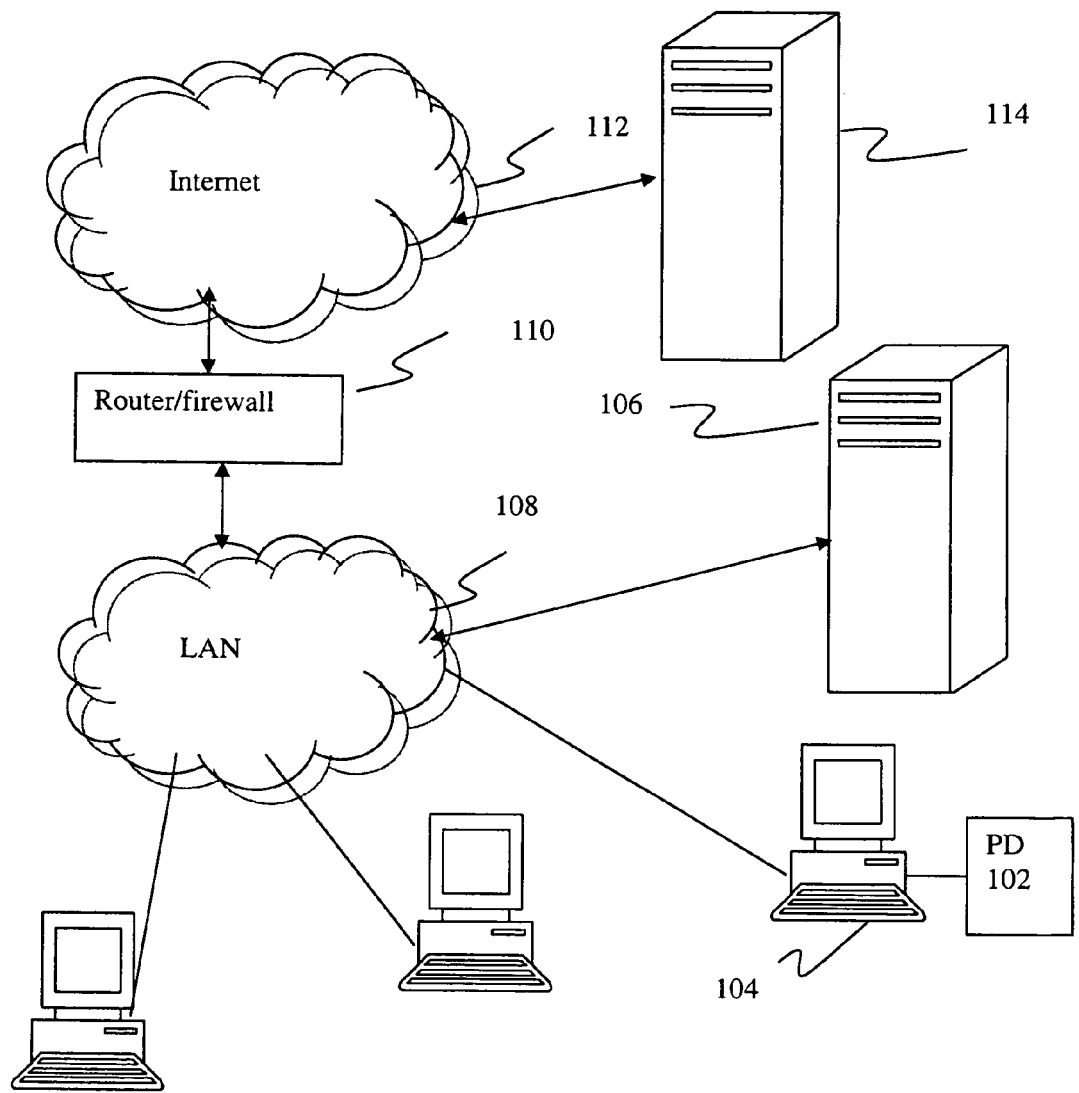
FIG. 1 is a high level block diagram showing an information processing system according to an embodiment of the invention.

Referring to FIG. 1, there is shown a high level block diagram showing an information processing system 100 according to an embodiment of the invention. A portable device (PD) 102 is coupled to an information processing system 104 such a personal computer. The PD is any portable electronic device that has sufficient storage to operate according to the embodiments discussed herein. The PD 102 includes a memory storing a personal computing environment, which is an image of the user's software that includes an operating system, applications, and the state of the system (e.g., which applications are open and the data displayed). Such a suspended environment is discussed in U.S. patent application Ser. No. 10/795,153, which is hereby incorporated by reference.

The PD 102 can be connected to any of a plurality of host computer systems 104. The host systems 104 are connected to each other via a local area (LAN) network 108, which is, in turn, connected to a wide area network such as the Internet 112. A router/firewall 110 is disposed between the Internet 112 and a LAN 108. In one embodiment, the LAN 108 is a cybercafé used by the public. A local zone provisioning server (LZPS) 106 for a local service zone allows a user of the PD 102 to download device drivers relevant to PC hardware in the host system 104, such as a device driver, for a device found in the host system 104 but the driver for such a device is not found in the PD 102. The driver is preferably signed by an authority that is trusted by the PD 102. The LZPS 106 can store or access all other drivers such as display, wireless, graphics accelerator, peripherals, USB devices and the like. The LZPS could be in the zone as shown in FIG. 1 or on the Internet. The system 100 can also comprise a second provisioning server 114 outside the local zone.

Figure 2:
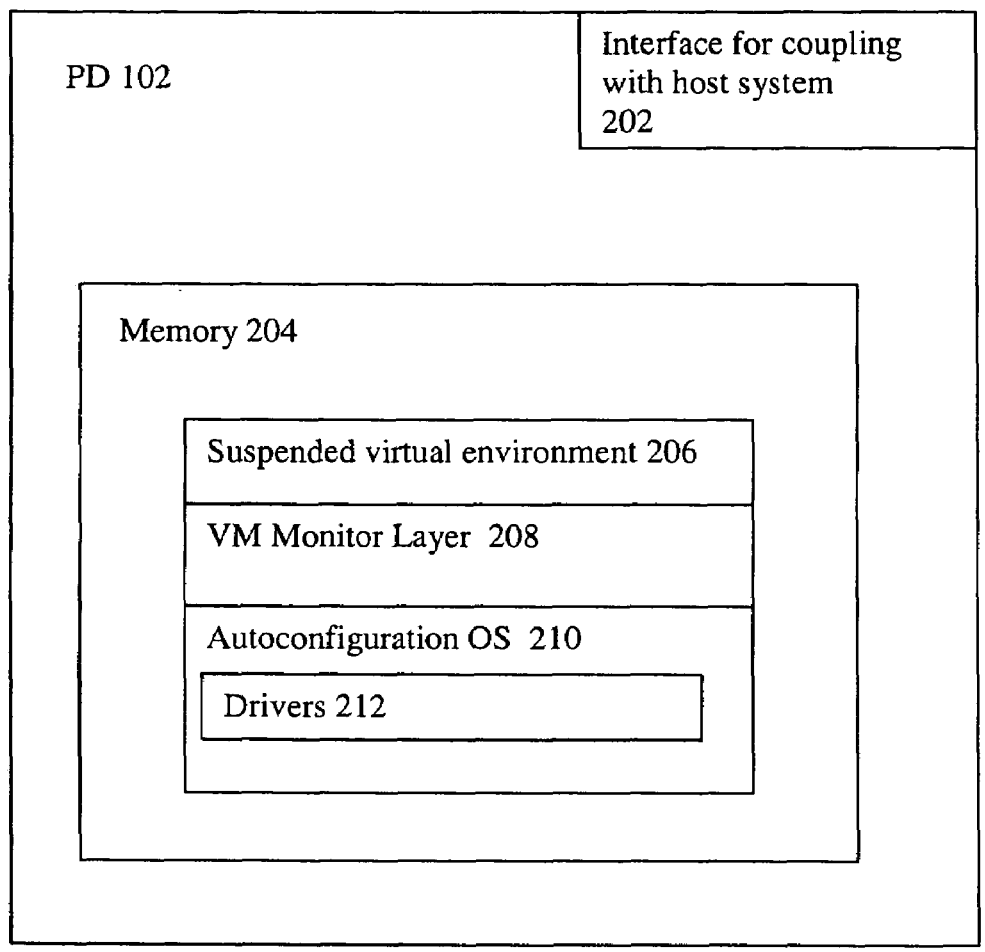
FIG. 2 is a simplified block diagram of a portable device using the invention.

Referring to FIG. 2, we show a simplified block diagram of a PD 102. The PD 102 comprises an interface 202 for coupling with a host system 104 and to download the required device drivers. The PD 102 also comprises a memory 204 that includes a suspended virtual environment 206, a VM monitor layer 208, an autoconfiguration OS 210, and drivers 212. The PD 102 downloads the drivers 212 through the host system 104 when it is coupled to the host system 104. The downloaded driver(s) is stored on the PD 102. The drivers 212 are stored in the Autoconfig OS part 210 of the PD 102 and are used only when coupled to a host system 104 and the host system 104 is booted using the autoconfiguring OS 210. If during a boot sequence, the PD 102 detects that it does not have specific drivers for a particular hardware element (device) in the host system 104 it queries the LZPS 106 to determine whether the LZPS 106 can provide the required driver. The boot sequence is complete when all the drivers 212 are loaded and the graphical user interface (GUI) is started. Since the PD 102 does not have direct connectivity to the network, it uses the network interface of the host system 104 to make this query. The PD 102 must already have the relevant driver for the network interface of the host system 104, but it can fetch any of the other device drivers including the driver for the display system and other input devices. If the device drivers are available and are certified by a signing authority trusted by the PD 102, as being trustworthy device drivers that are virus-free, the PD 102 downloads (receives and stores) the requested driver and adds it to its local repository of drivers 212. The next time that the PD 102 visits the same host system it will find that a driver exists locally and will not need to query the server 106 for a driver. In another embodiment, the PD 102 can always check with the server 106 to determine whether there is driver that is newer than the one in the repository. The drivers that are downloaded by the PD 102 are stored on the PD 102. The host system's software is not used by the PD 102 at all, to avoid any issues with viruses and Trojans.

Figure 3:
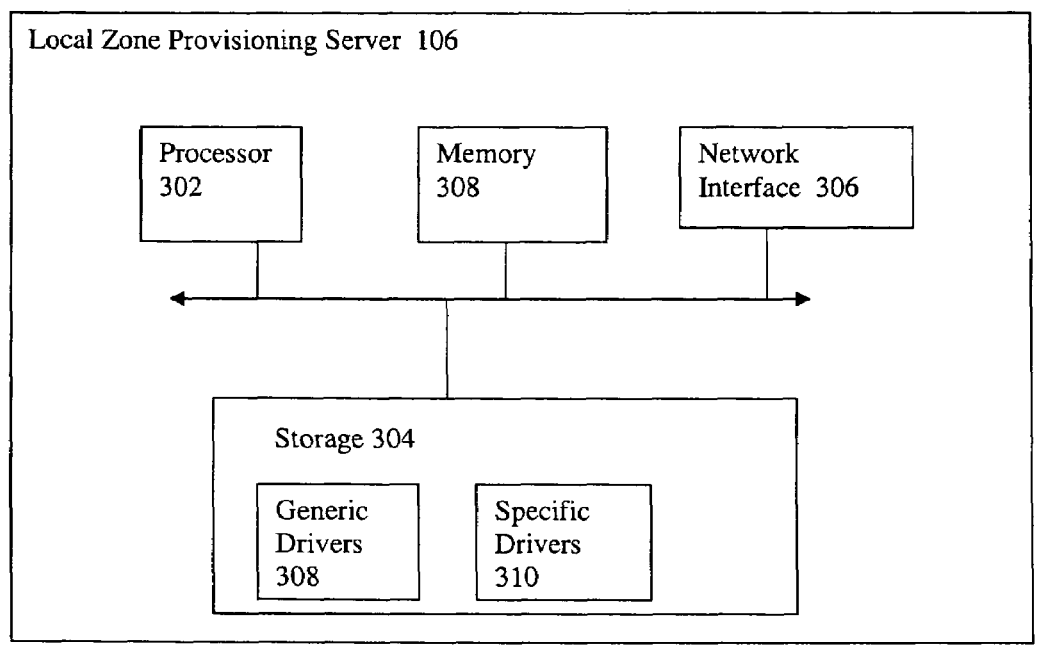
FIG. 3 is a simplified block diagram of a local provisioning using the invention.

Referring to FIG. 3, there is shown a highly simplified block diagram of a local zone provisioning server 106. The LZPS 106 includes a conventional processor 302, a storage device 304, a network interface 306, and a system memory 308. The storage device 304 stores programs and data such as an operating system, application programs, and server software. The storage device also stores generic drivers 308 and other specialized device drivers 310. The LZPS 106 is configured to respond to requests from host systems that are coupled with PDs for specific device drivers. The LZPS 106 can be in the local area network 108 or in the Internet 112.

The LZPS 106 keeps a log of host processing systems for which it is responsible and also keeps a log of peripheral devices that are attached to the host processing systems that it serves. In addition, it records the versions of host operating systems used by PDs that attach to host processing systems in the zone. The LZPS 106 periodically checks for newer versions of drivers for all peripherals and hardware it governs and host operating systems to which it caters.

Figure 4:
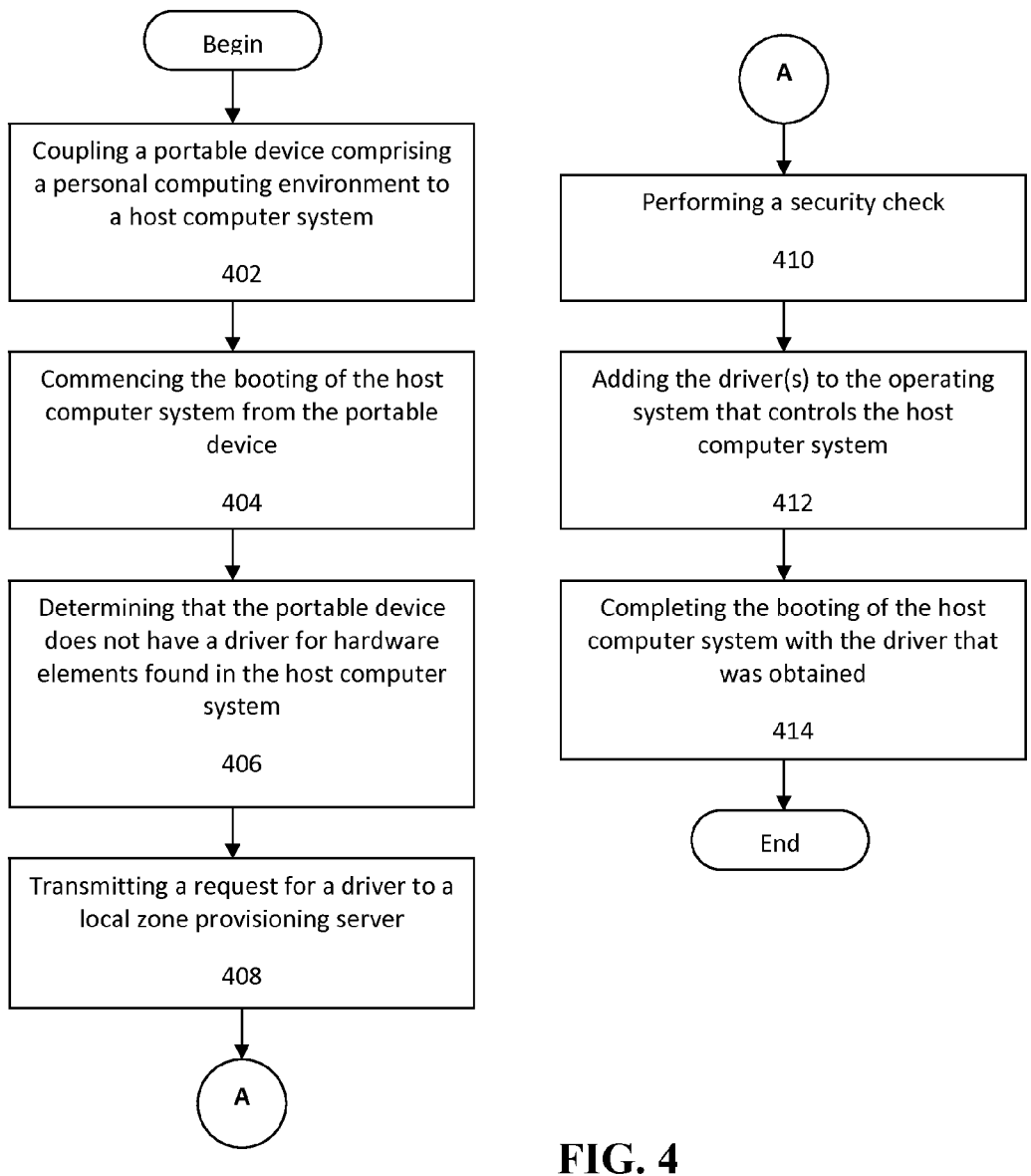
FIG. 4 is a flowchart of a method according to another embodiment of the invention.

Referring to FIG. 4, there is shown a flowchart of a method 400 according to an embodiment of the invention. Step 402 couples a client PD 102, comprising a personal computing environment, to a host computer system 104. Step 404 commences booting of the host system 104 from the client PD 102. Step 406 determines that the hardware found by the client PD in the local zone does not include a driver for one or more hardware elements found in the host system 104. Step 408 transmits a driver request to the local zone provisioning server 106, in a local service zone. In step 410, the server 106 performs a security check to determine the legitimacy of the request and if successful, the client PD 102 checks the integrity of the driver and adds it to its local repository of drivers 212. In step 412 the driver or drivers are added to the operating system that controls the host system 104. Step 414 completes the booting of the host computer with the driver that was obtained.

Therefore, while there has been described what is presently considered to be the preferred embodiment, it will understood by those skilled in the art that other modifications can be made within the spirit of the invention.

The invention claimed is:

1. A method for local provisioning of device drivers for a portable device, comprising steps of:

coupling the portable device comprising a personal computing environment to a host personal computer (PC) system within a network served by a local zone provisioning server, said portable device comprising memory for storing a user's personal computing environment, a network driver for accessing a network interface of the host PC system, and boot software that the user trusts and controls;

initiating a boot process on the host PC system from the portable device using the boot software, wherein the boot process boots the host PC system up to a stage where the portable device can connect to the local zone provisioning server and download all needed device drivers for working with peripherals attached to the host PC system;

connecting to the network interface of the host PC system using the network driver;

determining that the portable device does not have a device driver for a peripheral attached to the host PC system;

transmitting a request for the device driver to the local zone provisioning server, wherein the local zone provisioning server allows a user of the portable device to download the device driver presently accessible to the host PC system; and downloading to the portable device the device driver for the peripheral attached to the host PC system from the local zone provisioning server:

wherein the local zone provisioning server records versions of host operating systems used by portable devices that attach to the host PC system in the network;

wherein the local zone provisioning server performs periodic checks to determine whether all of the device drivers to which the local zone provisioning server has access are current and virus-free, wherein all of the device drivers comprises device drivers for all peripherals, hardware, and host PC systems under control of said local zone provisioning server.

2. The method of claim 1, wherein preceding the step of transmitting a request, the method further comprises transmitting a message to the local zone provisioning server inquiring whether the local zone provisioning server has the device driver and receiving a message from the local zone provisioning server confirming that the local zone provisioning server has the device driver.

3. The method of claim, 1 further comprising downloading a display driver.

4. The method of claim 1, further comprising transmitting a request to a local zone provisioning server when the local zone provisioning server is within a local zone.

5. The method of claim 1, further comprising downloading a device driver for Universal Serial Bus (USB) devices.

6. The method of claim 1, further comprising determining whether the local zone provisioning server has a newer version of each device driver in the portable device when the portable device is coupled to the host PC system served by the local zone provisioning server.

7. A local zone provisioning server comprising:

a network interface configured to receive requests for device drivers from at least one client portable device located within a local service zone; and a processor:

processing the requests for the device drivers, processing a query from the client portable device that seeks information on whether there is a specialized device driver stored in the local zone provisioning server for a hardware element in a host personal computer system to which the client portable device is coupled;

recording versions of host operating systems used by client portable devices that attach to the host personal computer system in the local service zone;

wherein the local zone provisioning server performs periodic checks to determine whether all of the device drivers to which the local zone provisioning server has access are current and virus-free, wherein all of the device drivers comprises device drivers for all peripherals, hardware, and host personal computer systems under control of said local zone provisioning server; and wherein the local zone provisioning server allows a user of the client portable device to download the device drivers required by the host personal computer system within the local service zone;

wherein the local zone provisioning server transmits to the client portable device the specialized device driver for the hardware element in the host personal computer system.

8. The local zone provisioning server of claim 7 wherein the processor is further configured for transmitting the device drivers to the client portable device.

9. The local zone provisioning server of claim 7, further comprising a storage device for storing the device drivers.

10. The local zone provisioning server of claim 7 further comprising an interface to another server comprising the device drivers.

11. The local zone provisioning server of claim 7, wherein the local zone provisioning server is in the local service zone.

12. The local zone provisioning server of claim 7 further comprising program code for periodically determining by the local zone provisioning server whether the device drivers to which the local zone provisioning server has access are current and virus-free.

13. A portable device comprising:

an interface configured for coupling the portable device to a host PC system comprising hardware elements; and a memory comprising a user's personal computing environment and software code for:

initiating booting of the host PC system from the portable device using software in the portable device that the user trusts and controls, wherein a boot process boots the host PC system up to a stage where the portable device can connect to a local zone provisioning server and download all necessary drivers for working with the hardware elements of the host PC system;

determining the hardware elements of the host PC system;

determining whether the portable device has a device driver for each hardware element found in the host PC system; and transmitting a request, to the local zone provisioning server, for the device driver for each hardware element found in the host PC system for which the portable device does not have the device driver; and download the device driver, from the local zone provisioning server, for each hardware element found in the host PC system for which the portable device does not have the device driver, wherein the local zone provisioning server records versions of the host operating systems used by portable devices that attach to the host PC system in the network;

wherein the local zone provisioning server performs periodic checks to determine whether all device drivers to which the local zone provisioning server has access are current and virus-free, wherein all of the device drivers comprises device drivers for all peripherals, hardware, and host PC systems under control of said local zone provisioning server.

14. The portable device of claim 13 further comprising program code for downloading the device driver from the local zone provisioning server.

15. The portable device of claim 13 further comprising program code for transmitting a message to the local provisioning server inquiring whether the local zone provisioning server has the device driver and receiving a message from the local provisioning server confirming that the local provisioning server has the device driver.

* * * * *